6644X

E. Skinner.

NO PRINTED SPECIFICATION AVAILABLE

Fire Place.

Patented Jul. 20, 1831.

7/20/1831 6644X

July 20. 1831

Elijah Skinner of Sandwich, N. H.
Letters Patent.

The schedule referred to in these Letters Patent and making part of the same containing a description in the words of the said Elijah Skinner himself of his improvement in the mantel for fire places patented to him on the 19th day of April A.D. 1822. which new improvement he calls the "inverted arch or curved mantel for fire places.

---

Be it known that I Elijah Skinner of Sandwich in the County of Strafford and State of New Hampshire, have invented a new and useful improvement or improvements in a mantel for common chimney fire places, or in that part of the work which covers the top of the fire place and throat of the chimney, called the inverted arch or curving mantel, and is constructed & improved from an improved mantel patented to me April 19th A.D. 1822. and that the following is a full & exact description of the construction and application of the said inverted arch or curving mantel as improved or invented by me _ First, I construct the mantel of five different figures of sheet or cast iron, or of burnished sheet brass or of any convenient metallic substance which is a good conductor of heat.

Figure 1:
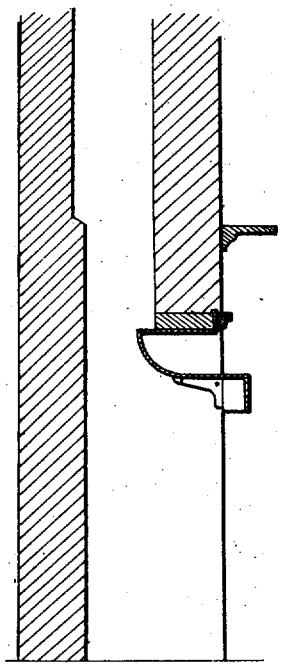

Figure 1. is a mantel constructed to be placed over a common fire place and conveniently attached to the same without building out or projecting new jambs, or covings. A part of the top of this mantel lies nearly horizontal when placed. The remaining part is arching or curving inward, extending to the inside of the breast of the chimney or bar which supports said breast, or a little beyond which is commonly from 4 to 6 inches inward from the front of the bar, then bending back again forming a horizontal plate over the curve & extending to the outer edge of said bar where it is turned, hooked, & connected thereto leaving a convenient space in the curve. The ends of that part of the mantel which falls within the jambs or covings are made to conform thereto, or the covings cut away to conform to the mantel. The remaining parts of the ends which project out are fitted in braces or end pieces of the same materials of the mantel and constructed to fasten upon the jambs to support the said mantel.

Figure 4:
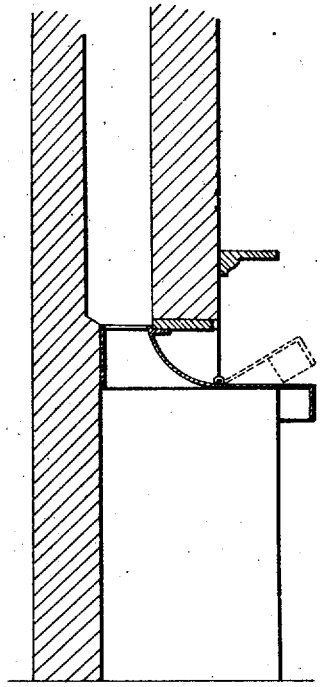
Figure 2:
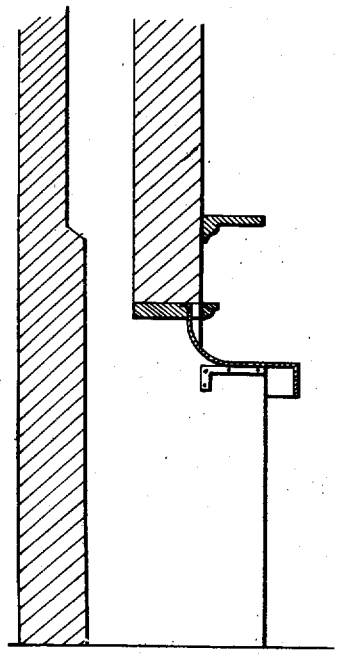
Figure 3:
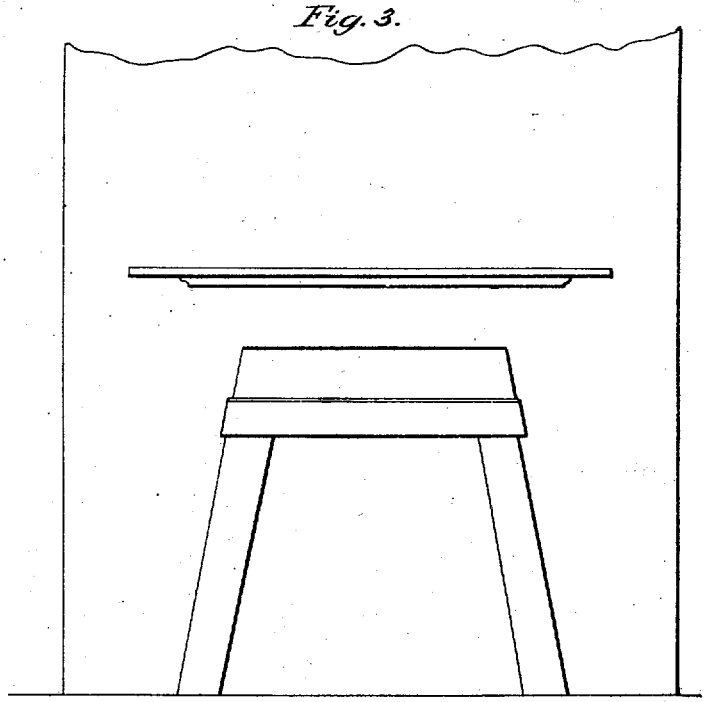

On the front edge of the mantel is formed a front piece from 2 to 4 or more inches in width turned down at right angles with the top to conform to the front of the jambs or covings of the fire place when placed and connected with
the brace at each end. This mantel may be made swelled in front and jambs
may — also be projected for the same. Fig. 2. Is a mantel constructed to sit
upon the top of a fire place of mason work projecting into the room a part of
the top of the mantel lying nearly horizontally upon the jambs when placed and
the remaining part arching or curving inward extending up to the front edge
of the bar which supports the breast of the chimney and connected therewith.
The front edge is turned down at right angles as described in figure 1.–
The ends are made to conform to the outside of the covings which are commonly
square also, at the ends are fastened straps of iron or end pieces of suitable length
& width to fasten the mantel to the covings or jambs. Figure 3. is a mantel as
described in figure 2d. with the front swelled from the inner edge of the covings.
Fig. 4. is a mantel formed to shut down similar to a box cover upon the top
of a fire place of mason work and the smoke is carried off in any required direction by
means of a sheet iron funnel. This mantel is similar to that of figure 2. in front
with the ends curved and a perpendicular back conforming thereto, forming
a box or curved pyramid with an aperture at the top of an oblong square
or it may be constructed to face two ways for two fireplaces –
Figure 5. is a mantel for the same purpose as figure 4. with straight ends
which may be more convenient in some cases –
What I claim as new and as my own improvement in the above described man-
tel, and for the use of which I ask an exclusive privilege is the curving or arching
construction of the mantles in their various forms or figures for the purpose of
better securing the draught of smoke and conducting & radiating the heat into
the room & other conveniences. Allegations – When this mantel is attached to
old chimneys, the new back should be built perpendicular especially for large
fire places extending about one foot above the old mantel or bar, leaving
the throat or opening at the top about 4 or 5 inches in depth and extending
the whole width of the fire place and chimney channel. I sometimes make
use of a regulator of sheet iron in the throat of the chimney constructed to
move forward or backward to regulate the heat and draught or close up
the throat of the chimney at pleasure to prevent the smoke pouring down the
chimney from other fire places. The mantels are most commonly made of sheet iron, I sometimes use casings of the same materials of the mantel fastened upon the front of the jambs or covings with the edges turned inward about one inch to conform thereto. The mantels should be often brushed and kept free from soot. In the use of this mantel I contemplate constructing the jambs or covings of the fire-place so that commencing from the hearth upwards they converge towards the top about one foot in three similar to a section of a pyramid, and in some cases I form the back of the fire place to conform thereto so that the covings and back form three sides of the section of the pyramid, the object of which is to compress the heat from the hearth as it rises to the mantel before it is expanded in the channel of the chimney & that the communication of heat be not cut off at the entrance of the throat of the chimney by a sudden rush of air from the room.

Witnesses
Aaron B. Hoyt
John W. Jewett

Elijah Skinner

[illegible]